(12) United States Patent
Winkler et al.

(10) Patent No.: US 9,316,277 B2
(45) Date of Patent: Apr. 19, 2016

(54) COMBINED VEHICLE BRAKE

(71) Applicant: Continental Teves AG & Co. oHG, Frankfurt (DE)

(72) Inventors: Thomas Winkler, Mainz (DE); Jürgen Bauer, Wiesbaden (DE); Jürgen Balz, Hünstetten-Oberlibbach (DE); Stefan Pfeiffer, Eppstein (DE); Dirk Koch, Lollar-Odenhausen (DE); Thomas Böhme, Mörfelden (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 0 days.

(21) Appl. No.: 14/427,144

(22) PCT Filed: Sep. 9, 2013

(86) PCT No.: PCT/EP2013/068594
§ 371 (c)(1),
(2) Date: Mar. 10, 2015

(87) PCT Pub. No.: WO2014/040948
PCT Pub. Date: Mar. 20, 2014

(65) Prior Publication Data
US 2015/0240893 A1    Aug. 27, 2015

(30) Foreign Application Priority Data

Sep. 17, 2012   (DE) .......................... 10 2012 216 588

(51) Int. Cl.
*F16D 65/14*    (2006.01)
*F16D 65/18*    (2006.01)
(Continued)

(52) U.S. Cl.
CPC ............ *F16D 65/18* (2013.01); *F16D 2121/04* (2013.01); *F16D 2121/18* (2013.01);
(Continued)

(58) Field of Classification Search
CPC . F16D 65/18; F16D 2121/04; F16D 2125/40; F16D 2123/00; F16D 2121/18; F16D 2121/26; F16H 25/2204
USPC ........... 188/106 F, 71.9, 72.1, 72.3, 72.6, 156
See application file for complete search history.

(56) References Cited

U.S. PATENT DOCUMENTS

| 4,809,824 | A  | * | 3/1989 | Fargier | ...................... B60T 8/32 |
| | | | | | 188/106 P |
| 6,536,561 | B1 | * | 3/2003 | Keller | ...................... B60T 1/062 |
| | | | | | 188/162 |

(Continued)

FOREIGN PATENT DOCUMENTS

| DE | 102009014340 | 9/2010 |
| DE | 102009036824 | 2/2011 |

(Continued)

OTHER PUBLICATIONS

International Search Report for International Application No. PCT/EP2013/068594 mailed Dec. 12, 2013.

(Continued)

*Primary Examiner* — Thomas J Williams
*Assistant Examiner* — Mariano Sy
(74) *Attorney, Agent, or Firm* — RatnerPrestia

(57) ABSTRACT

A combined vehicle brake having a hydraulically actuable driving brake and an electromechanically actuable parking brake device. In a brake housing, a hydraulic operating pressure space is bounded by a brake piston chargeable with hydraulic pressure medium to carry out normal braking. The brake piston is actuable along a longitudinal axis of the piston, and the parking brake device acts on the brake piston by a gearing converting the rotational movement of an electromechanical actuator into a translation movement and bringing about an actuation of the brake piston in order to carry out parking brake operations and keeping the brake piston in the actuated position. The gearing has a threaded spindle and a threaded nut which are in contact with each other via a plurality of rolling bodies. The frictional moment transmitted by the further axial bearing is higher than the returning torque of the threaded spindle.

11 Claims, 3 Drawing Sheets

(51) Int. Cl.
*F16H 25/22* (2006.01)
*F16D 121/04* (2012.01)
*F16D 121/26* (2012.01)
*F16D 123/00* (2012.01)
*F16D 121/18* (2012.01)
*F16D 125/40* (2012.01)

(52) U.S. Cl.
CPC ......... *F16D2121/26* (2013.01); *F16D 2123/00* (2013.01); *F16D 2125/40* (2013.01); *F16H 25/2204* (2013.01)

(56) References Cited

U.S. PATENT DOCUMENTS

| | | | |
|---|---|---|---|
| 6,971,484 B2* | 12/2005 | Sekiguchi | F16D 65/18 188/72.7 |
| 7,942,247 B2* | 5/2011 | Adachi | B60T 13/741 188/156 |
| 8,616,348 B2 | 12/2013 | Winkler | |
| 8,671,789 B2* | 3/2014 | Osterlaenger | F16H 25/2233 188/72.8 |
| 8,800,341 B2 | 8/2014 | Osterlanger | |
| 2003/0042084 A1* | 3/2003 | Kawase | F16D 55/00 188/72.1 |
| 2003/0050147 A1* | 3/2003 | Backes | F16D 65/18 475/343 |
| 2004/0163900 A1* | 8/2004 | Beuerle | B60T 13/741 188/72.1 |
| 2008/0283345 A1* | 11/2008 | Balz | F16D 65/18 188/72.6 |
| 2009/0211858 A1* | 8/2009 | Leiter | B60T 7/107 188/265 |
| 2012/0018262 A1* | 1/2012 | Winkler | F16D 65/18 188/106 F |
| 2013/0327606 A1* | 12/2013 | Platzer | F16D 65/0006 188/368 |

FOREIGN PATENT DOCUMENTS

| | | |
|---|---|---|
| WO | 2007051809 | 5/2007 |
| WO | 2008037738 | 4/2008 |

OTHER PUBLICATIONS

German Search Report mailed Jul. 19, 2013 for German Application No. 10 2012 216 588.6.

* cited by examiner

COMBINED VEHICLE BRAKE

CROSS REFERENCE TO RELATED APPLICATIONS

This application is the U.S. National Phase Application of PCT/EP2013/068594, filed Sep. 9, 2013, which claims priority to German Patent Application No. 10 2012 216 588.6, filed Sep. 17, 2012, the contents of such applications being incorporated by reference herein.

FIELD OF THE INVENTION

The present invention relates to a combined vehicle brake which has a hydraulically actuable service brake and an electromechanically actuable parking brake apparatus, a hydraulic service pressure space being delimited in a brake housing by a brake piston which can be loaded with hydraulic pressure medium in order to carry out service brake operations, with the result that the brake piston can be actuated along a piston longitudinal axis in order to achieve a braking action, and the parking brake apparatus acting on the brake piston by means of a rotational/translational gear mechanism which is driven by an electromechanical actuator and brings about an actuation of the brake piston in order to carry out parking brake operations and stops in the actuated position, the rotational/translational gear mechanism having a threaded spindle and a threaded nut which are in contact with one another via a plurality of rolling bodies, and with an axial bearing, on which the threaded spindle is supported.

BACKGROUND OF THE INVENTION

A hydraulic vehicle brake with an electrically actuable parking brake apparatus is known, for example, from the older international patent application of the applicant WO 2008/037738 A1, which is incorporated by reference. The special feature of the previously known vehicle brake consists in that the rolling bodies are arranged between two stops in the thread such that they can be moved to a limited extent, a spring element being arranged between the rolling bodies and one stop and making sliding of the rolling bodies possible during load-free actuation of the gear mechanism and making rolling of the rolling bodies possible during actuation of the gear mechanism under load. These features achieve a situation where the gear mechanism can be produced inexpensively. Here, the gear mechanism is configured as a two-stage step-down gear mechanism, one stage of the step-down gear mechanism having a self-locking action.

SUMMARY OF THE INVENTION

An aspect of the present invention is based on improving a combined vehicle brake of the generic type mentioned at the outset, in such a way that the overall degree of efficiency of the parking brake apparatus can be increased.

According to an aspect of the invention, this is achieved by way of an apparatus having a further axial bearing which is connected in series with the axial bearing, which further axial bearing acts only during the release operation of the parking brake apparatus and is designed in such a way that the frictional moment which is transmitted by the further axial bearing is higher than the retrodriving moment of the threaded spindle brought about by the rotational/translational gear mechanism.

It is provided in one particularly advantageous development of the subject matter of the invention that the further axial bearing is formed by a first frictional face which is configured in the brake housing and a second frictional face which is configured on a torque transmission element which can be brought into force-transmitting connection with the threaded spindle.

In one advantageous embodiment which can be produced inexpensively, the first frictional face is configured on an annular disk. Here, the disk is composed of plastic or metal.

Another advantageous design variant provides that the first frictional face is provided on a wall which is configured in the brake housing, stands perpendicularly with respect to the threaded spindle and delimits the hydraulic service pressure space.

In one advantageous development of the subject matter of the invention, an optimum design of the axial bearings which are used in the gear mechanism is achieved by virtue of the fact that the mean frictional radius of the first frictional face corresponds to the mean rolling radius of the first axial bearing.

BRIEF DESCRIPTION OF THE DRAWINGS

In the following text, the invention will be explained in greater detail using one exemplary embodiment in conjunction with the appended drawing, in which.

DETAILED DESCRIPTION OF THE INVENTION

Figure 1:
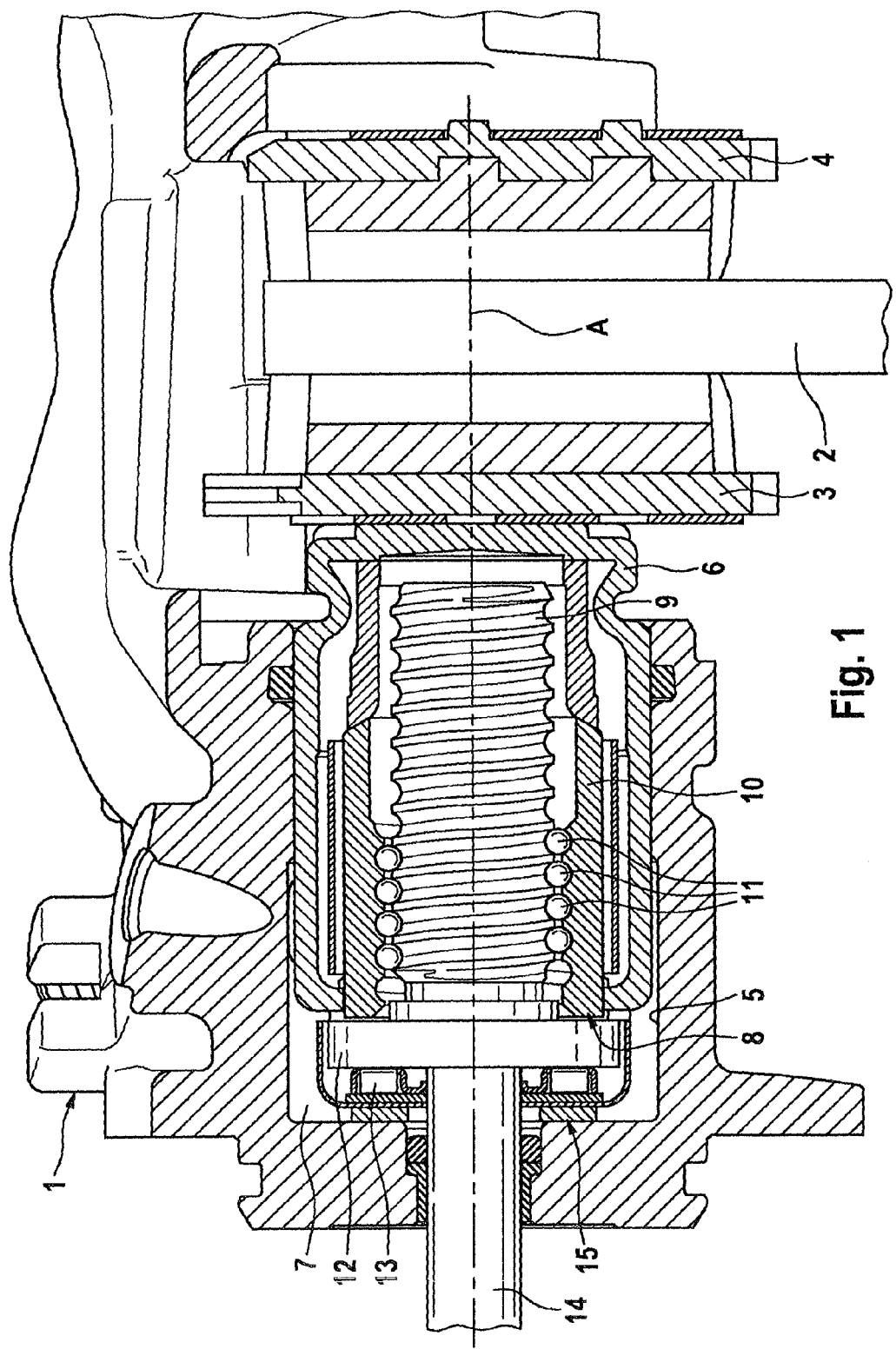
FIG. 1 shows a sectional illustration of the vehicle brake according to the invention with a hydraulically actuable service brake and an electromechanically actuable parking brake.

The vehicle brake according to an aspect of the invention which is shown in FIG. 1 has firstly a hydraulically actuable service brake and secondly an electromechanically actuable parking brake apparatus. The vehicle brake has a brake housing 1 which engages around the outer edge of a brake disk 2 (indicated merely diagrammatically) and two brake pads 3, 4. On its inner side, the brake housing 1 forms a brake cylinder 5 which receives a brake piston 6 in an axially displaceable manner. Brake fluid can be fed into the service pressure space 7 which is formed between the brake cylinder 5 and the brake piston 6 in order to carry out service brake operations, with the result that a brake pressure is built up which displaces the brake piston 6 axially along a piston longitudinal axis A toward the brake disk. As a result, the brake pad 3 which faces the brake piston 6 is pressed against the brake disk 2, the brake housing 1 being displaced in the opposite direction as a reaction and, as a result, also pressing the other brake pad 4 against the brake disk 2.

A parking brake apparatus for carrying out parking brake operations is electromechanically actuable and likewise acts on the brake piston 6. To this end, a rotational/translational gear mechanism 8 is provided which converts the rotational movement of an electromechanical actuator (not shown) into a translational movement and brings about an actuation of the brake piston 6 along the axis A. The gear mechanism 8 is formed substantially by a threaded spindle 9 and a threaded nut 10 which are connected to one another via rolling bodies 11. The rolling bodies are configured as balls 11. A shank 14 which is connected to the threaded spindle 9 projects out of the brake housing 1 on the side which faces away from the brake disk and is driven by an electromechanical actuator (not shown) with a step-down gear mechanism (likewise not shown) being connected in between. The rotational movement which is transmitted to the threaded spindle 9 is transmitted via the balls 11 which are situated in the thread between the threaded spindle 9 and the threaded nut 10 to the threaded nut 10 which performs a translational movement in the direction of the axis A. As a result, the brake piston 6 is also actuated, on which the threaded nut 10 is supported. At the same time, the threaded spindle 9 is supported on the brake housing 1 via an axial bearing 13 and a collar 12 which is connected to the spindle 9. The gear mechanism 8 therefore converts the rotational movement of the electromechanical actuator into a linear movement and is responsible for generating both the brake application force and the release force for carrying out a parking brake operation.

Figure 2:
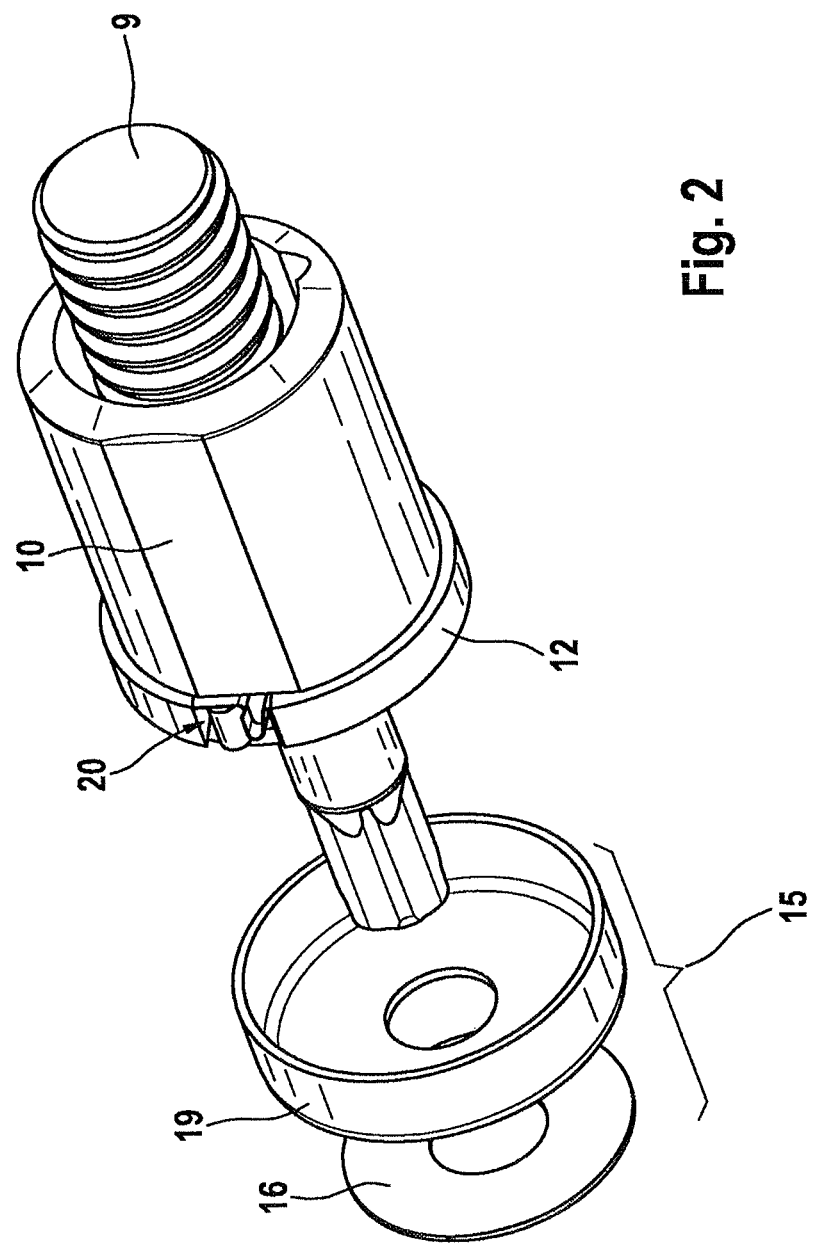
FIGS. 2, 3 show, partially as exploded drawings, one embodiment of the gear mechanism according to the invention which can be used in a vehicle brake according to FIG. 1.
Figure 3:
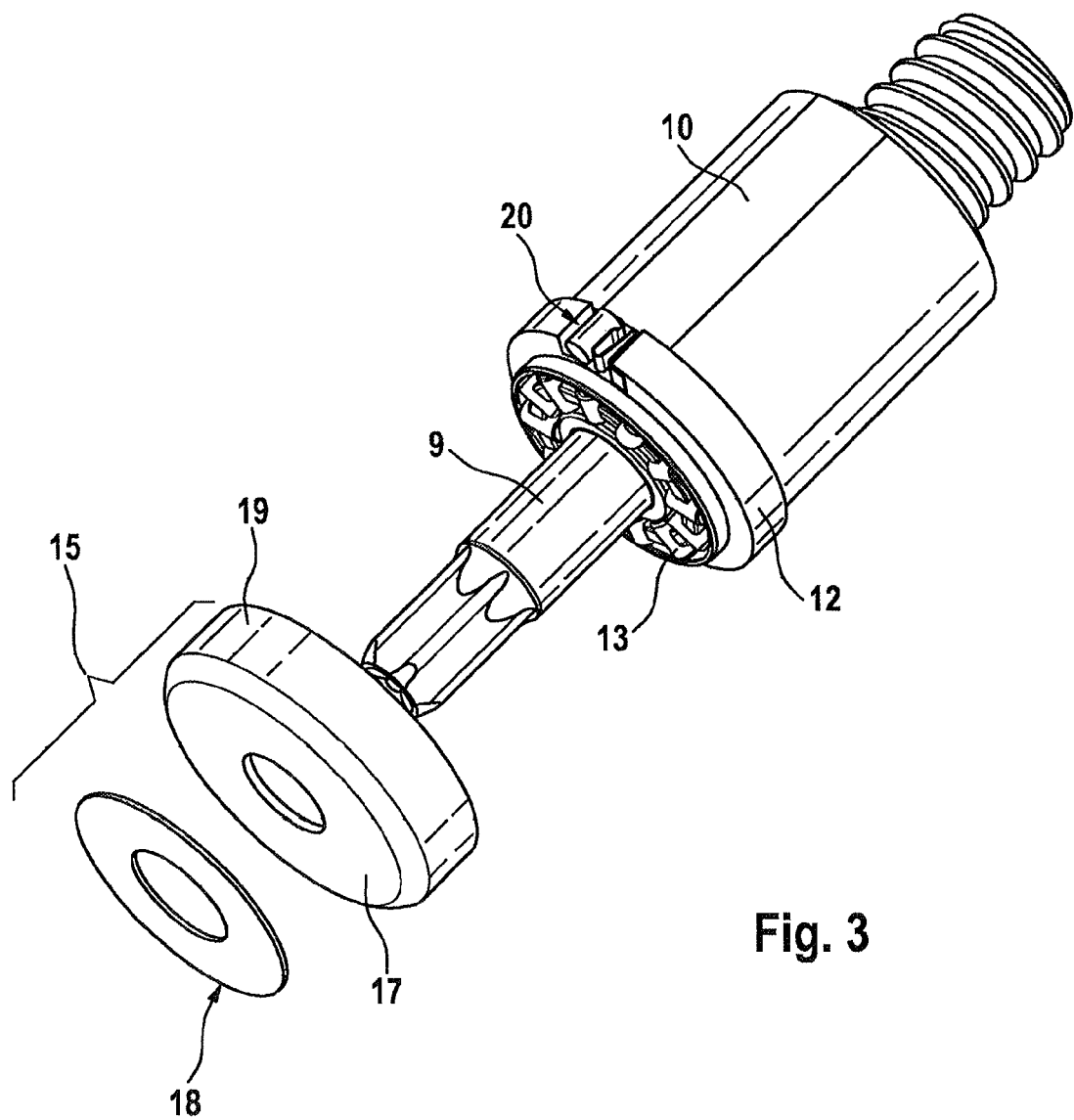

As can be gathered, moreover, from the drawing, a further axial bearing which is provided with the designation 15 is connected in series with the axial bearing 13. Here, the further axial bearing 15 which is active only during a release operation of the parking brake apparatus consists in principle of a first frictional face 16 which is configured in the brake housing 1 and a second frictional face 17 is formed which can be brought into force-transmitting connection with the threaded spindle 9. In the advantageous embodiment of the subject matter of the invention which is shown in the drawing, the first frictional face 16 is configured on an annular disk 18 which is supported axially on the brake housing 1. Here, the disk 18 can be configured from a suitable plastic or metal. As an alternative, the first frictional face 16 can be configured on a perpendicular wall of the brake housing 1, by which the hydraulic brake pressure space 7 is delimited. In contrast, the second frictional face 17 is configured on a preferably cup-shaped torque transmission element 19 which engages radially around the abovementioned radial collar 12 of the threaded spindle 9. A transmission of the force which acts in the brake application direction of the parking brake apparatus from the threaded spindle 9 to the torque transmission element 19 takes place by means of a freewheel mechanism which is indicated in FIGS. 2 and 3 and which bears the designation 20. An optimum function of the brake apparatus according to the invention is achieved by virtue of the fact that the mean frictional radius of the first frictional face 16 corresponds to the mean rolling radius of the first axial bearing 13. The second axial or plain bearing 15 is designed in such a way that the frictional moment which results from the brake application force is greater than the moment which is generated in the gear mechanism 8.

Whereas the brake application of the parking brake apparatus takes place via the first axial bearing 13, the brake application force is dissipated only via the second axial bearing 15, to be precise preferably via the relative movement of the torque transmission element 19 with respect to the disk 18. Otherwise, the method of operation of the above-described arrangement is known, for example, from the international application WO 2008/037738 A1 which was mentioned at the outset and forms the generic type, and does not need to be explained in greater detail in this context.

The invention claimed is:

1. A combined vehicle brake which has a hydraulically actuable service brake and an electromechanically actuable parking brake apparatus, a hydraulic service pressure space being delimited in a brake housing by a brake piston which can be loaded with hydraulic pressure medium in order to carry out service brake operations, with the result that the brake piston can be actuated along a piston longitudinal axis in order to achieve a braking action, and the parking brake apparatus acting on the brake piston (6) by a rotational/translational gear mechanism which is driven by an electromechanical actuator and brings about an actuation of the brake piston in order to carry out parking brake operations and stops in the actuated position, the rotational/translational gear mechanism having a threaded spindle and a threaded nut which are in contact with one another via a plurality of rolling bodies, and with an axial bearing, on which the threaded spindle is supported, wherein a further axial bearing is connected in series with the axial bearing, which further axial bearing acts only during the release operation of the parking brake apparatus and is designed in such a way that the frictional moment which is transmitted by the further axial bearing is higher than the retrodriving moment of the threaded spindle which is generated by the rotational/translational gear mechanism.

2. The combined vehicle brake as claimed in claim 1, wherein the further axial bearing is formed by a first frictional face which is configured in the brake housing and a second frictional face which is configured on a torque transmission element which can be brought into force-transmitting connection with the threaded spindle.

3. The combined vehicle brake as claimed in claim 2, wherein the first frictional face is configured on an annular disk.

4. The combined vehicle brake as claimed in claim 3, wherein the first frictional face is provided on a wall which is configured in the brake housing, stands perpendicularly with respect to the threaded spindle and delimits the hydraulic service pressure space.

5. The combined vehicle brake as claimed in claim 3, wherein the disk is composed of a plastic.

6. The combined vehicle brake as claimed in claim 3, wherein the disk is produced from a metal.

7. The combined vehicle brake as claimed in claim 2, wherein a mean frictional radius of the first frictional face corresponds to a mean rolling radius of the first axial bearing.

8. The combined vehicle brake as claimed in claim 2, wherein the torque transmission element is of cup-shaped configuration and engages around a radial collar which is configured on the threaded spindle.

9. The combined vehicle brake as claimed in claim 8, wherein a freewheel mechanism provided between the torque transmission element the radial collar.

10. The combined vehicle brake as claimed in claim 9, wherein the freewheel mechanism configured as a ramp/rolling body arrangement.

11. The combined vehicle brake as claimed in claim 9, wherein the freewheel mechanism is configured as a drag spring.

* * * * *